Figure 1:
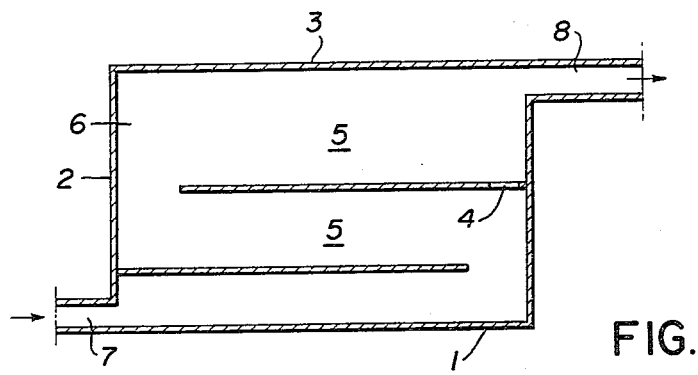

United States Patent [19]

Pielkenrood

[11] 4,253,964

[45] Mar. 3, 1981

[54] DEVICE FOR BRINGING ABOUT PARTICLE GROWTH IN A FLOWING LIQUID SUSPENSION

[75] Inventor: Jacob Pielkenrood, Krommenie, Netherlands

[73] Assignee: Pielkenrood-Vinitex B.V., Assendelft, Netherlands

[21] Appl. No.: 761,281

[22] Filed: Jan. 21, 1977

[30] Foreign Application Priority Data

Jan. 28, 1976 [NL] Netherlands ................ 7600848

[51] Int. Cl.³ ............................................ B01D 21/00
[52] U.S. Cl. ................................. 210/513; 210/541
[58] Field of Search ................ 210/84, 513, 521, 522, 210/541; 209/155–157, 160; 55/440, 442, 521; 23/273 R, 274

[56] References Cited

U.S. PATENT DOCUMENTS

| 1,695,619 | 12/1928 | Trautmann | 23/274 |
| 2,193,706 | 3/1940 | Attwood | 210/84 |
| 3,331,510 | 7/1967 | Arnold | 210/521 X |
| 3,357,955 | 12/1967 | Bryan | 23/274 X |

FOREIGN PATENT DOCUMENTS

| 531798 | 1/1922 | France | 210/521 |
| 19560 | of 1893 | United Kingdom | 210/513 |
| 237412 | 7/1925 | United Kingdom | 210/522 |

*Primary Examiner*—William A. Cuchlinski, Jr.
*Attorney, Agent, or Firm*—Smyth, Pavitt, Siegemund, Jones & Martella

[57] ABSTRACT

A method and a device for bringing about particle growth in a flowing liquid by making use of the velocity differences caused by wall friction in a flow duct through which the liquid is caused to flow, which duct is directed at an angle in respect of the vertical direction, and is, in particular, horizontally directed.

4 Claims, 3 Drawing Figures

DEVICE FOR BRINGING ABOUT PARTICLE GROWTH IN A FLOWING LIQUID SUSPENSION

In a prior patent application U.S. Ser. No. 353,543, filed Apr. 23, 1973 of the present inventor, Mr. Jacob Pielkenrood, for METHOD & DEVICE FOR BRINGING ABOUT PARTICLE GROWTH IN A FLOWING LIQUID SUSPENSION, abandoned in favor of Ser. No. 559,132 filed Mar. 17, 1975 of the same inventor and title, abandoned in favor of Ser. No. 667,962 filed Mar. 18, 1976 of the same inventor and title, a method and a device for bringing about growth of particles suspended in a flowing liquid have been described.

The liquid to be treated is led through at least one substantially vertical flow channel before being supplied to a separation device, the average flow velocity during the whole treatment being maintained at such a value that substantially all the particles are dragged along in the flow, and particle growth is obtained by coalescence of particles as a consequence of velocity differences between these particles, which differences are, at least partially, a consequence of a transverse velocity gradient in the liquid flow caused by friction against the walls of the flow channel. Moreover also small turbulences will be created which increase the probability of particles meeting one another. In particular the flow channel can be divided into a number of consecutive interconnected and substantially parallel channel parts with alternating flow sense so as to allow to arrange a channel having the desired length within a restricted space, and, furthermore, this channel or consecutive parts thereof can be constructed so that the transverse velocity gradient cannot become so large that the shear forces caused thereby and by the related turbulences acting on the grown particles will lead to annihilation of the particle growth, which is, in particular, obtained by increasing the transverse cross-sectional area in the flow sense either step-wise or gradually, so that, at a constant flow rate, the linear velocity of the flow decreases and/or the wall distance increases, so that, furthermore, the velocity gradient will be decreased accordingly. By inserting auxiliary partitions extending substantially in the flow direction, the transverse velocity gradient can be increased, which partitions can be made slidable so as to enable a variation of their effect. According to the said prior patent application the flow channel can be defined by arranging substantially vertical partitions in a tank, defining consecutive chambers which are interconnected alternately above and below said partitions. In another prior patent application Ser. No. 521,573 filed Nov. 7, 1974 by the present inventor Mr. Jacob Pielkenrood for COALESCENCE APPARATUS, now U.S. Pat. No. 3,972,819, a similar device has been described in which the channel is defined by a tube or hose having consecutive portions which are interconnected by adapted bend elements, which, in many cases, will lead to a simplification of the construction of such a device, in particular if commercially available tubes are used.

These prior patent applications have been based on the consideration that such particle growth would only satisfactorily take place in a substantially vertical channel, since in a substantially horizontal channel the separation path length of particles in the direction of gravity towards an adjacent wall is relatively small, so that during passage through said channel some separation might take place, and the separated particles might settle on the channel walls, which, in the long run, would lead to obstruction since such a device is not designed as a separator, and, therefore, is not provided with means for continually removing the separated components.

The invention provides a method and a device in which, in contrast to the said prior patent applications, the channel in which the particle growth takes place is directed at an angle with the vertical, and is, in particular, directed substantially horizontally. For it has unexpectedly appeared that the flow velocity in channels directed in such a manner can be made sufficiently large so as to drag along the particles through the channel without an appreciable separation. Such an arrangement different from the vertical direction will lead, in many cases, to a more favourable utilisation of the available space when assembling the device.

Figure 2:
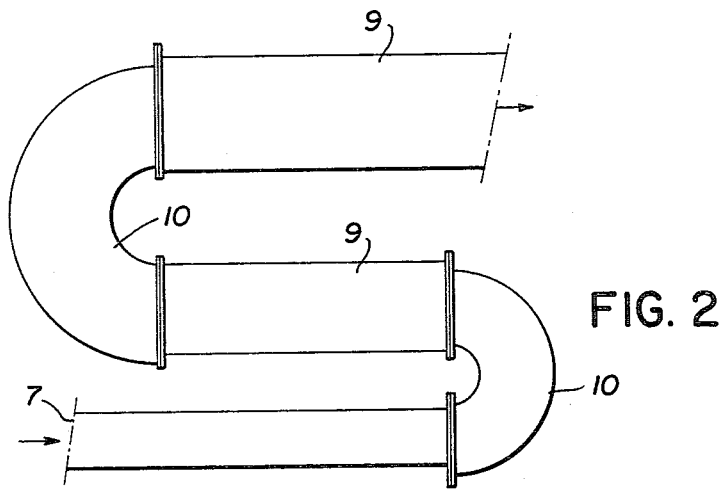
Figure 3A:
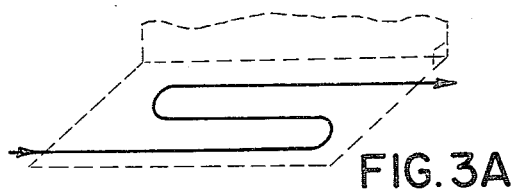
Figure 3C:
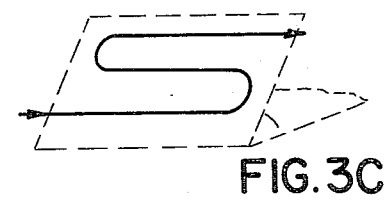
Figure 3B:
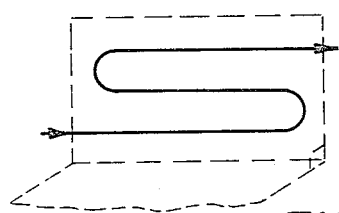
Figure 3D:
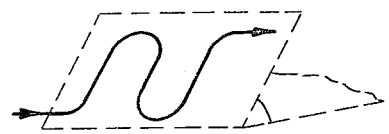

The invention will be described below by reference to a drawing, showing in:

FIG. 1 a schematic representation of a device according to the specification;

FIG. 2 a partial view of a modified embodiment of this device, and

FIG. 3 simplified representations of different manners of positioning the device of FIG. 2.

In FIG. 1 a section of a device according to the invention is shown in a highly simplified manner. This device comprises a vessel 1 with lateral walls 2 and end walls 3, in which vessel partitions 4 are provided which are directed parallel to the end walls 3, and are connected alternately to one or the other lateral wall 2. In this manner chambers or channels 5 are defined which are interconnected at 6 between an extremity of the partition 5 in question and the adjacent lateral wall 2.

In this manner a continuous channel with alternating flow sense is provided, which channel, on the one hand, communicates with a supply duct 7 and, on the other hand, with a discharge duct 8. The latter duct 8 is to be connected to a separation device.

The present device can be constructed in such a manner that the individual channels 5 are mutually superposed, but it is also possible to juxtapose these channels in another direction.

Because of a friction against the partitions 4 the liquid flow will be retarded, so that a transverse velocity gradient will be generated. The particles in a faster liquid flow part can overtake particles in a slightly slower adjacent flow part, and, moreover, small turbulences will increase the meeting probability still further, which will lead to coalescence of these particles and, thus, to a considerable particle growth. It is, however, possible that the larger particles thus obtained will be disrupted again as a consequence of shearing forces between adjacent flow layers with a different velocity, so that it is sometimes advisable to reduce the velocity gradient in the downstream sense. This can be done, as shown, by increasing the distance between the partitions 4 in the flow sense, so that, at the same flow rate, the linear velocity and, thus, the velocity gradient, will be reduced too, and, moreover, the distance between the walls becomes larger, which as well will bring about a reduction of the velocity gradient.

FIG. 2 shows a modified embodiment in which, as described in a prior patent application U.S. Ser. No. 521,573, the flow is not led through a vessel 1 with partitions 4, but, instead, through tubes 9 which are interconnected by means of bend elements 10. These tubes 9 are directed substantially horizontally, and can be superposed or juxtaposed. The consecutive tubes can have, as seen in the flow sense, an increasing cross-section, the bends then serving as adapting members.

If it is favourable for an economic use of the available space, the channels 5 or tubes 9 can also be superposed obliquely or can be arranged at an angle in respect of the horizontal plane. FIG. 3 shows schematically different possibilities, viz. at A in a horizontal, and at B in a vertical plane, and at C and D tubes arranged in a sloping plane are shown. Similar possibilities exist in the case of the embodiment of FIG. 1.

It will be clear that the number of consecutive chambers 5 or tube portions 9 is not restricted to the case shown.

I claim:

1. A device for bringing about particle growth in a flowing liquid suspension, comprising:

at least two tubes, spaced apart, having parallel longitudinal axes lying in a common plane, of substantially equal length, and extending side-by-side between two spaced planes perpendicular to the common plane, the common plane inclined at an angle with respect to vertical;

at least one bend element including a generally U-shaped tube connecting adjacent ends of successive pairs of said tubes so as to form a continuous flow channel with alternating direction of flow extending successively through said tubes and said bend elements alternately, the cross sectional area of said flow channel perpendicular to the direction of flow always exceeding a predetermined area so that the flow velocity along said flow channel remains smaller than the velocity at which particle growth is annihilated.

2. The device of claim 1 wherein said at least two tubes and said at least one bend element are of such size that the cross sectional area of said flow channel perpendicular to the direction of flow progressively increases along said flow channel, whereby the flow velocity progressively decreases in the direction of flow.

3. A device for bringing about particle growth in a flowing liquid suspension, comprising:

at least two tubes, spaced apart, having parallel longitudinal axes lying in a common plane, of substantially equal length, and extending side-by-side between two spaced planes perpendicular to the common plane, the common plane inclined at an angle of approximately 90 degrees with respect to vertical;

at least one bend element including a generally U-shaped tube connecting adjacent ends of successive pairs of said tubes so as to form a continuous substantially horizontal flow channel with alternating direction of flow extending successively through said tubes and said bend elements alternately, the cross sectional area of said flow channel perpendicular to the direction of flow always exceeding a predetermined area so that the flow velocity along said flow channel remains smaller than the velocity at which particle growth is annihilated.

4. A device for bringing about particle growth in a flowing liquid suspension, comprising:

a chamber having a box-like shape and including a pair of opposing parallel vertical lateral walls and a pair of opposing end walls inclined at an angle with respect to a horizontal plane, one of said lateral walls including a supply duct through which the liquid suspension flows into said chamber and the other lateral wall including a discharge duct through which the liquid suspension flows out of said chamber to a separation device; and, at least two partitions within said chamber, generally aligned with said end walls, spaced apart from each other and from said end walls, attached alternately to opposite lateral walls, each of said at least two partitions extending from the lateral wall to which it is attached toward the opposite lateral wall and terminating a distance from the opposite lateral wall, the distance being generally comparable to the spacing between adjacent partitions, to form within said chamber a continuous flow channel with alternating direction of flow extending from said supply duct to said discharge duct, the cross-sectional area of said flow channel perpendicular to the direction of flow always exceeding a predetermined area so that the flow velocity within said flow channel remains smaller than the velocity at which particle growth is annihilated, the spacing between successive partitions along the direction of flow increasing progressively so that the cross-sectional area of said flow channel perpendicular to the direction of flow progressively increases, whereby the flow velocity progressively decreases in the direction of flow.

* * * * *